United States Patent
Ishii et al.

[15] 3,687,898
[45] Aug. 29, 1972

[54] PROCESS FOR THE PRODUCTION OF HEAT RESISTANT OXYMETHYLENE POLYMER

[72] Inventors: Takami Ishii, Ichihara; Shotaro Sugiura, Chiba; Naohisa Takikawa, Ichihara, all of Japan

[73] Assignee: Ube Industries, Ltd., Tamaguchi-ken, Japan

[22] Filed: May 27, 1970

[21] Appl. No.: 40,907

[30] Foreign Application Priority Data

June 4, 1969 Netherlands..............6908497

[52] U.S. Cl. ..............................260/67 FP
[51] Int. Cl..............................C08g 1/24, C08g 1/26
[58] Field of Search........................260/67 FP, 615.5

[56] References Cited

UNITED STATES PATENTS 3,193,532  7/1965  Sidi........................260/67 FP
3,437,640  4/1969  Schweitzer et al.....260/67 FP
3,477,994  11/1969  Schweitzer et al.....260/67 FP

*Primary Examiner*—William H. Short
*Assistant Examiner*—L. M. Phynes
*Attorney*—Sherman and Shalloway

[57] ABSTRACT

A process for producing a heat-resistant polymer consisting predominantly of oxymethylene repeating units, said process comprising submitting a high-molecular-weight polymer consisting predominantly of oxymethylene repeating units to the action concurrently of
a. a capping agent selected from the group consisting of acid anhydrides, oxyalkylene kiesters and linear oxyalkylene diethers, and
b. a Lewis acid.

3 Claims, 6 Drawing Figures

Fig. 4-A
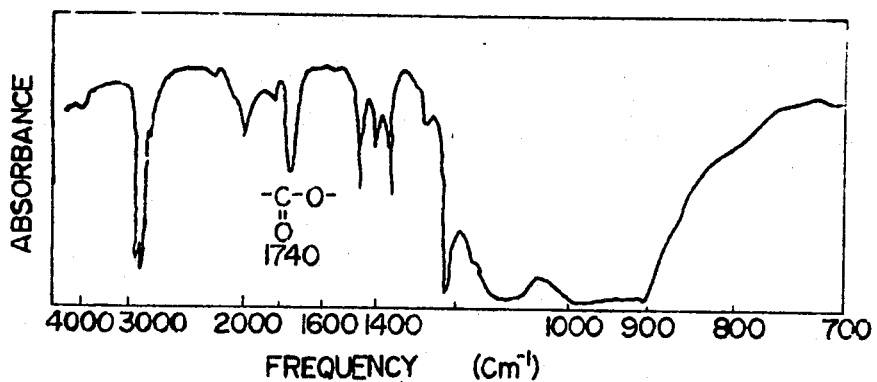
Fig. 4-B
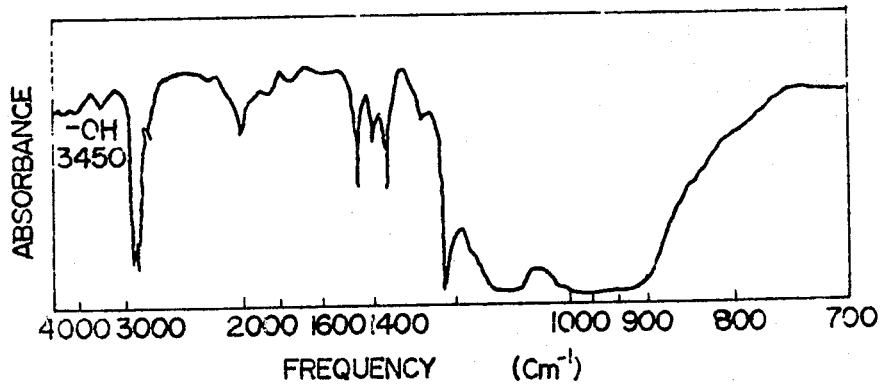

PROCESS FOR THE PRODUCTION OF HEAT RESISTANT OXYMETHYLENE POLYMER

This invention relates to a process for producing a heat-resistant polymer predominantly of oxymethylene repeating units (hereinafter referred to simply as polyoxymethylene). More specifically, the invention relates to a process for producing a heat-resistant high-molecular-weight oxymethylene polymer by submitting a high-molecular homopolymer or copolymer consisting of oxymethylene repeating units to the action concurrently of a specific capping agent and a Lewis acid to thereby form a heat-resistant high-molecular-weight oxymethylene polymer whose thermal stability has been improved while retaining the excellent mechanical properties that are possessed by the high-molecular-weight oxymethylene polymer.

Numerous processes are known for producing polyoxymethylene. A majority of these are processes in which the terminal grouping of the polyoxymethylene obtained by catalytically polymerizing formaldehyde or trioxane is stabilized. For example, Japanese Pat. application publication No. 6099/1958 (U.S. Pat. Nos. 2,964,500 and 2,998,409) discloses a method of obtaining a heat-resistant polymer by the esterification of a polymer of formaldehyde with a carboxylic acid anhydride. However, the polymer produced by such methods has weak bonds within its main chain which are susceptible to being split by heat since by these methods the terminal grouping of the polymer of formaldehyde or trioxane has been merely stabilized. Hence, the thermal stability of the stabilized polymer is not necessarily adequate, with the consequence that it is necessary to make a further addition of a stabilizer before it can be of practical use. Further, for adjusting the molecular weight to that desired in these methods, much trouble and inconvenience are experienced since the molecular weight adjustment operation must be performed during the polymerization of the monomers.

Recently, a method has been suggested wherein polyoxyethylene is stabilized by the intrasubstitution of the polyoxymethylene main chain by the oxyethylene units by reacting polyoxymethylene with dioxolan in the presence of a Friedel-Crafts type catalyst such as boron trifluoride (British Pat. No. 1,103,730). According to this method, the thermal stability is improved as a result of the interposing of the oxyethylene units in the oxymethylene repeating units but, on the other hand, there is the drawback that the crystallinity declines and the mechanical properties, e.g., tensile strength, falls.

We found that when polyoxymethylene was submitted to the action concurrently of a specific capping agent, i.e., either an acid anhydride, oxyalkylene diester or linear oxyalkylene diether, and a Lewis acid heat-resistant polyoxymethylene whose thermal stability was notably improved while retaining intact the mechanical properties of high-molecular-weight polyoxymethylene could be obtained.

It is therefore an object of the present invention to provide a heat-resistant polyoxymethylene which, while retaining intact the mechanical properties of high-molecular-weight polyoxymethylene, possesses markedly improved thermal stability.

Another object of this invention is to provide a heat-resistant polyoxymethylene possessing markedly improved thermal stability without interposing in the main chain of the oxymethylene repeating units a heterogeneous repeating unit.

A further object of the invention is to provide a process for producing heat-resistant polyoxymethylene whose average molecular weight can be readily adjusted to a range desirable for a molding resin as well as whose range of molecular weight distribution is also readily adjusted.

Other objects and advantages of the present invention will become apparent from the following description.

When a high-molecular weight polyoxymethylene is submitted, in accordance with the present invention, to the action concurrently of the aforesaid capping agent, e.g., acetic anhydride, and a Lewis acid, the severance of the main chain of oxymethylene repeating units and the end capping by means of an acetyl group are accomplished simultaneously, with the consequence that the adjustment of the decline in average molecular weight and the thermal stabilization are simultaneously achieved. While this reaction mechanism is not quite clear, it is theorized that the capping agent specified by the present invention forms a complex with the Lewis acid, e.g., boron trifluoride, and that this complex forms coordinate bonds at the carbon and oxygen atoms of the main chain of oxymethylene repeating units and thereafter the severance of oxymethylene main chain and the acetylation of one of the ends and the acetoxidation of the other end are simultaneously accomplished as a result of intramolecular rearrangement. It is known that a zipping reaction of the starting polyoxymethylene takes place when polyoxymethylene is submitted to the action of an acid catalyst. It is however possible according to the present invention to adjust the average molecular weight of the thermally stabilized polyoxymethylene as well as the molecular weight distribution within the ranges desired without setting up substantially any zipping reaction from the severed ends by submitting the polyoxymethylene to the actions of the aforesaid capping agent and Lewis acid concurrently. Further, since the stabilization according to the present invention is carried out without interposing in the main chain of oxymethylene repeating units any heterogeneous repeating units which might cause a disturbance to the crystalline structure, the film formed from this heat-resistant polymer is extremely tough and is no less than that formed from high-molecular-weight polyoxymethylene.

The homopolymer or copolymer consisting of high-molecular-weight oxymethylene repeating units to be used in the invention process is imposed no special restriction, but those of the highest possible molecular weight are preferred. This is because the main chain of oxymethylene repeating units of the starting polymer is severed at a number of intermediate points, with the consequence that the molecular weight of the polyoxymethylene after its severance must be a value sufficient that the shaped articles made from the polyoxymethylene-obtained by practicing this invention demonstrate physical properties which make the article suitable for practical use. It is generally preferred that the molecular weight of the starting polymer, as indicated by its inherent viscosity $[\eta]$, is at least 1, and particular in the range of $3 - 12$.

As the starting polymer, aside from the homopolymer of either formaldehyde, trioxane or tetraoxane, the copolymer of either formaldehyde, trioxane or tetraoxane with a monomer copolymerizable therewith, e.g., cyclic ethers, cyclic acetals or ketones, can be used. However, from the standpoint of the mechanical properties of the intended heat-resistant polymer, it is preferable that at least 90 mol percent of the polymer chain units are composed of oxymethylene units. The most suitable starting polymer is polyoxymethylene.

The capping agent that is used in the invention process is selected from the group consisting of acid anhydrides, oxyalkylene diesters and linear oxyalkylene diethers. As the acid anhydrides, the anhydrides of aliphatic carboxylic acids of two to 18 carbon atoms, e.g., acetic acid, propionic acid, butyric acid, valeric acid, caproic acid, capric acid, lauric acid and stearic acid, or the anhydrides of aromatic carboxylic acids, e.g., benzoic acid, toluic acid and phenylbenzoic acid, can be used. The carboxylic acids are preferably monovalent. The oxyalkylene diesters that are used in the present invention can be indicated by the following formula

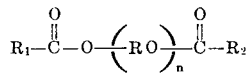

wherein R is alkylene, and particularly methylene or ethylidene, $R_1$ and $R_2$ are each alkyl or aryl group of up to 18 carbon atoms, and $n$ is an integer from 1 to 10.

As examples of these oxyalkylene diesters, mention can be made of such as methylene diacetate, methylene dipropionate, dioxymethylene diacetate, dioxymethylene dipropionate, trioxymethylene diacetate, trioxymethylene dipropionate, tetraoxymethylene diacetate, tetraoxymethylene dipropionate and methylene dibenzoate. On the other hand, the linear oxyalkylene diethers that are used in the present invention are compounds of the formula

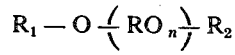

wherein R is alkylene, particularly methylene or ethylidene, $R_1$ and $R_2$ are each alkyl or aryl groups of up to 18 carbon atoms, and $n$ is an integer from 1 to 10. Examples of these compounds include such as trioxymethylene dimethylether, tetraoxymethylene dimethylether, trioxymethylene diethylether, tetraoxymethylene diphenylether, dimethylethers of low-molecular weight polyoxymethylene and dimethylethers of oxymethylene/oxyethylene copolymer.

As Lewis acids, useable in the present invention are (a) the Friedel-Crafts type halides, e.g., $BF_3$, $BCl_3$, $BBr_3$, $BI_3$, $AlCl_3$, $TiCl_4$, $SnCl_4$, $SnBr_4$, $FeCl_3$, $ZnCl_2$ and $SbCl_5$, or (b) the complexes of said halides with ethers, esters, cyclic ethers, acid anhydrides, alcohols, ketones and water. It is, of course, possible to use a wide range of Lewis acids aside from those illustrate above, but it goes without saying that these Lewis acids must be those which are capable of forming a complex with the aforesaid capping agent.

In the present invention the foregoing capping agent and Lewis acid may be added separately to the reaction system, or it is also possible to first form a complex of the capping agent and Lewis acid, following which the so formed complex is added to the system. At this time it is usually preferred to combine the Lewis acid with an excess of the capping agent.

While the invention reaction can be carried out in either the vapor or liquid phase, the generally preferred practice is to carry out the reaction in the liquid phase by using either the capping agent itself or another inert solvent as the reaction solvent. Useable as the inert solvent are the aliphatic hydrocarbons such as n-hexane, n-heptane, n-octane, isooctane, decane and naphtha, the alicyclic hydrocarbons such as cyclohexane and methylcyclonexane, the aromatic hydrocarbons such as benzene, toluene, xylene and ethylbenzene, the halogenated hydrocarbons such as carbon tetrachloride, dichloroethane, trichloroethylene, chlorobenzene and dichlorobenzene, the esters such as ethyl acetate, butyl acetate and ethyl acetoacetate, the ketones such as methyl ethyl ketone, acetone and cyclohexanone, and the ethers such as ethyl ether.

The reaction conditions will vary depending upon the class of the starting polymer, the capping agent and the Lewis acid used, as well as the average molecular weight of the intended polymer. However, generally speaking, the Lewis acid is preferably present in a concentration of 1/100 millimole per liter – 100 millimoles per liter, and particularly 0.1 – 10 millimoles per liter, in the case of the liquid phase reaction.

The capping agent is preferably used in an amount of at least 1 percent by weight, and particularly 10 – 100 percent by weight, of the starting polymer. The concentration of the capping agent in the reaction system is preferably at least 1 percent by weight, and particularly 20 – 50 percent by weight. The starting polymer can be reacted in a homogeneous system by dissolving in a reaction medium or it can also be reacted in a state of suspension in the reaction medium and, in this case, it is preferred that the concentration of the starting polymer in the reaction medium is in a range of 1 – 99 percent, and particularly 5 – 20 percent.

There is no particular restriction as to the reaction temperature, but usually preferred is a range $-50°$ to $180°$ C., and particularly $20° - 160°$ C. The reaction pressure may range from normal to superatmospheric pressure, for example, 1 – 300 atmospheres (gauge), and particularly 1 – 50 atmospheres (gauge). In carrying out the reaction it is effective to reduce the partial pressure of formaldehyde by building the pressure of the reaction system up to 1 – 100 kg/cm² with an inert gas, say, nitrogen. The reaction time will vary depending upon the temperature and the catalyst concentration but a time of 1 – 200 minutes, and particularly 5 – 60 minutes, is sufficient.

Thus is obtained in accordance with the invention process a polyoxymethylene whose molecular weight and distribution thereof have been adjusted to the range desired and, in addition, whose heat resistance has been greatly improved while retaining intact the excellent mechanical properties of high-molecular-weight polyoxymethylene. Hence, by utilizing the correlation between the reaction time, catalyst concentration and reaction temperature, and the average molecular weight of the resulting polyoxymethylene, it becomes possible by choosing the foregoing reaction conditions to produce, a polyoxymethylene having the desired average molecular weight and molecular weight distribution.

For a better understanding of the present invention, reference is had to the accompanying drawings, wherein:

FIG. 4 is a graph depicting the infrared spectra of the polyoxymethylene before practicing the invention process (FIG. 4-B) and of the polyoxymethylene after practicing the invention process (FIG. 4-A);

Figure 5:
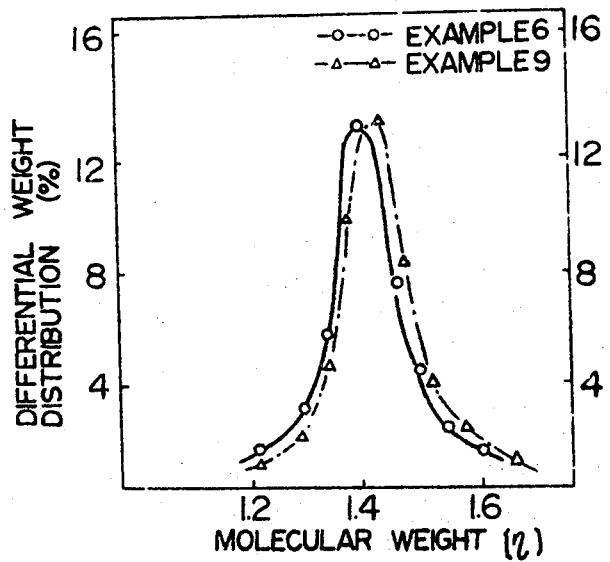

and FIG. 5 is a graph indicating the molecular weight distribution of the polyoxymethylene obtained by the invention process.

Figure 1:
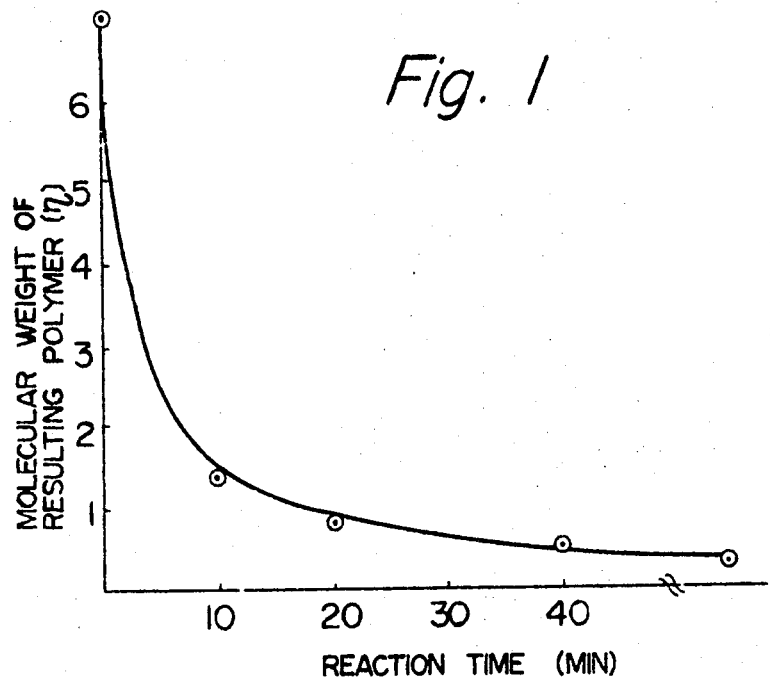
FIG. 1 is a graph depicting the relationship between the reaction time and the inherent viscosity (molecular weight) of the resulting polymer, as obtained from of the experiment of Example 1.
Figure 2:
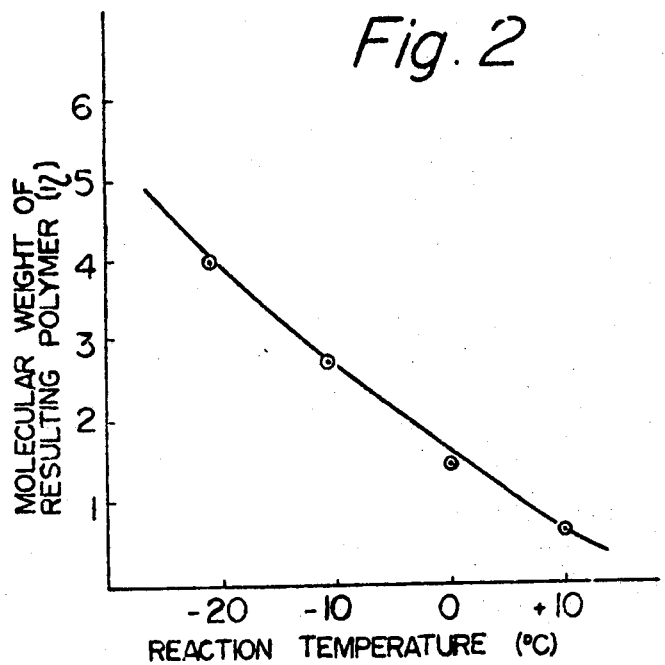
FIG. 2 is a graph illustrating the relationship between the reaction temperature and the molecular weight of the resulting polymer, as obtained from the experiment of Example 4.
Figure 3:
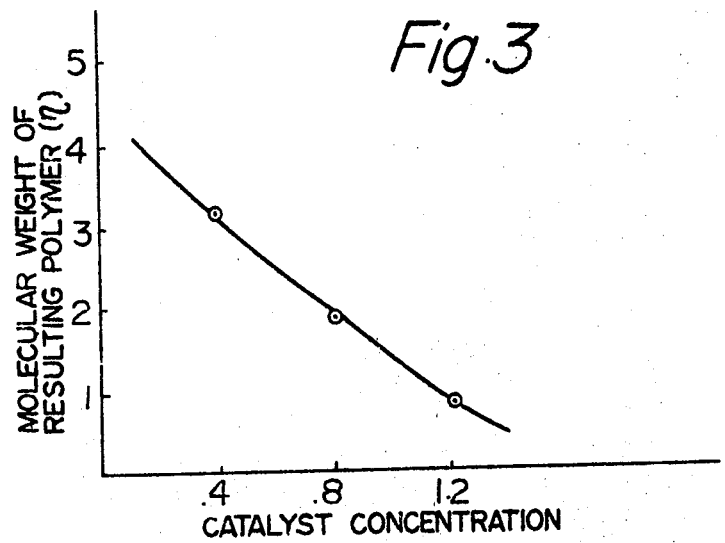
FIG. 3 is a graph showing the relationship between the catalyst concentration and the inherent viscosity of the resulting polymer, as obtained in Example 5.

As is apparent from FIG. 1 – 3, the average molecular weight of the stabilized polymer decreases when either the reaction temperature or the catalyst concentration is raised or when the reaction time is prolonged. On the other hand, in the opposite case the average molecular weight of the stabilized polymer can be maintained at a relatively high level. Hence, it is possible in accordance with the invention process to adjust the average molecular weight as well as its distribution in an optional range by a suitable choice of the reaction temperature and time, and the catalyst concentration, irregardless of the average molecular weight of the starting polyoxymethylene, provided that the average molecular weight of this starting polymer is sufficiently high.

In the conventional methods of stabilizing the ends of the polyoxymethylene that have been practiced in the past, the thermal stability of the resulting stabilized polymer was not yet fully satisfactory. In addition, since the adjustment of the average molecular weight and the distribution thereof had to be carried out during the polymerization step, its control was exceedingly difficult. However, according to invention process, the adjustment of the average molecular weight and the distribution thereof of the stabilized polymer is exceedingly simple as hereinbefore noted, provided that the average molecular weight of the starting polymer is sufficiently high.

Further, as apparent from FIG. 4, it is seen that in the infrared absorption spectrum of the polyoxymethylene subsequent to practicing the invention an absorption at 1,740 cm$^{-1}$ attributable to the ester group appears anew with marked intensity, and the relative values of the absorptions at 3,450 – 3,470 cm$^{-1}$ attributable to the hydroxyl group declines conspicuously.

It is believed that the polymer end severed and formed anew by the formation of a coordination bond in the main chain of the starting polyoxymethylene by the Lewis acid capping agent complex (an acetic anhydride complex of $BF_3$ in this case) has been substantially completely esterified.

Further, it can be appreciated from FIG. 5 that, even though starting materials having different molecular weights are used, the molecular weight distribution of the polyoxymethylene after having been submitted to the present invention demonstrates a normal distribution in all cases, thus showing that the invention process is a very easy method for adjusting the average molecular weight and molecular weight distribution.

The reaction in accordance with the invention process proceeds successively and hence the reaction can be stopped at any point desired. The reaction can be stopped readily by the addition of a stop agent to the reaction system. As the stop agent, included are:

1. the alcohols such as methanol, ethanol, propanol, butanol, octanol, cyclohexanol, ethylene glycol, propylene glycol, diethylene glycol and benzyl alcohol, or water;
2. the amines such as mono-, di- and tri-methylamines, ethylamines, propylamines, butylamines, hexylamines and phenylamines, triethyldiamine, hexamethylenediamine, ethanolamine, ethyleneimine and polyethyleneimine;
3. the amine oxides such as tri-n-butylamine oxide and triethylamine oxide;
4. the phosphines such as triphenylphosphine and phosphine oxide;
5. the ureas such as urea, thiourea, mono- or dialkyl or aryl-substituted urea, or the derivatives thereof;
6. the lactams such as beta-propiolactam, gamma-butyrolactam, delta-valerolactam and epsilon-caprolactam;
7. the lactones such as beta-propiolactone, gamma-butyrolactone, delta-valerolactone and epsilon-caprolactone; and
8. the ketones such as cyclohexanone, methyl ethyl ketone, acetone and acetyl acetone. Certain of these stop agents, e.g., ketones, can also be used as the reaction medium, provided that they do not raise the basicity of the reaction medium excessively. The addition of the stop agent in an amount at least equivalent to the Lewis acid will do but is preferably added such that the concentration becomes at least 1 percent.

For a further understanding of the present invention, the following examples are given. The values for the reaction rate constant for thermal degradation at 222° C. $k_{222}$, inherent viscosity $[\eta]$ and toughness in the following examples were measured in accordance with the procedures described in Japanese Pat. application publication No. 9794/1957 (U.S. Pat. 2,768,994, British Pat. No. 753,299).

That is to say, the reaction rate constant for thermal degradation which is an indication of thermal stability was obtained in the following manner. About 1 gram of the specimen polymer was weighed, and the amount of thermal degradation of this polymer was continuously followed up as it was being heated by means of a vapor bath of methyl salicylate while passing nitrogen through it. The reaction rate constant for thermal degradation was obtained from the inclination of the curve of the thermal degradation time vs, the residual weight percent of the polymer plotted from the amount of thermal degradation that was measured for 30 minutes at 1-minute intervals.

Since this degradation reaction can be regarded as being for the most part a first order reaction, the reaction rate constant for thermal degradation $k_{222}$ was expressed in percent per minute.

The inherent viscosity $[\eta]$ is a value that was obtained at 60° C. in a solvent system of parachlorophenol containing 2 percent of alpha-pinene.

On the other hand, the toughness was determined in the following manner. A film about 0.1 mm in thickness was first folded over for 180°, following which it was folded back over the same folding line for 360°, this being designated as one cycle. This operation was repeated using the line of fold ruptured, the number of cycles required for the repture being an indication of the toughness.

EXAMPLE 1

Four 50 cc stoppered Erlenmeyer flasks were each charged with 25 cc of toluene, 25 cc of acetic anhydride and 5 grams of polyoxymethylene having $[\eta] = 7.30$ and $k_{222} = 2.69$ prepared from formaldehyde by introduction polymerization using acetylacetone cobalt as catalyst and n-heptane as the reaction solvent. After the reaction solutions were thoroughly stirred with a magnetic stirrer, $BF_3\text{-}O(C_2H_5)_2$ was added thereto as catalyst in a ratio of 100 m mol per liter. The reaction solution were then held at 0° C. at normal pressure. Ten minutes after the catalyst was added, the contents of flask No. 1 was introduced into a large quantity of methanol to stop the reaction, following which the polymer obtained was separated, thoroughly washed in methanol and vacuum dried for 4 hours at 60° C. The contents of the flasks Nos. 2 – 4 to which the catalyst had been added were likewise respectively introduced into large quantities of methanol 20, 40 and 90 minutes after addition of the catalyst and thereafter given the same treatment that the contents of flask No. 1 had been given. The weight yield of the resulting polymers (hereinafter referred to as simply yield) based on the starting polyoxymethylene was 100 percent in all instances. The properties of the so obtained polymers are shown below.

| No. | Reaction time (min) | $k_{222}$ (%/min) | $[\eta]$ | Toughness | M.P. |
|---|---|---|---|---|---|
| 1 | 10 | 0.21 | 1.4 | >100 | 178 |
| 2 | 20 | 0.15 | 0.8 | >100 | 178 |
| 3 | 40 | 0.10 | 0.5 | 10 | 175 |
| 4 | 90 | 0.04 | 0.3 | 0 | 174 |

It can be seen from FIG. 1 which has been prepared from the above values and shows the relationship between the reaction time ($t$) and $[\eta]$ that for obtaining polyoxymethylene having $[\eta] = 1.5 - 0.3$, which are desirable for practical purposes, a reaction time of about 10 minutes under the reaction conditions of Example I will do.

EXAMPLES 2 – 5

The stabilization of polyoxymethylene was carried out by operating as in Example 1, except that the reaction conditions indicated in Table I were used. The result obtained are shown in Table I.

TABLE I

| Example | Starting polymer Amount charged (g.) | Starting polymer $(\eta)$ | Capping agent Name of substance | Capping agent Amount charged (cc.) | Reaction solution Name of substance | Reaction solution Amount charged (cc.) | Catalyst (Lewis acid) Name of substance | Catalyst Concentration[1] | Reaction conditions (° C.) | Pressure (kg./cm.²) | Hour (min.) | Stop method[2] | Yield (g.) | Resulting polymer $(\eta)$ | Resulting polymer $k_{22}$ (percent/min.) | Toughness | M.P. (° C.) | Coloration |
|---|---|---|---|---|---|---|---|---|---|---|---|---|---|---|---|---|---|---|
| 1 | 5.0 | 7.3 $k_{222}=2.7$ | Acetic anhydride | 25 | Toluene | 25 | BF₃OEt₂ | 100 | 0 | Normal pressure | 10 20 40 90 | Stop agent methanol | 4.98 | 1.4 0.8 0.5 0.3 | 0.21 0.15 0.10 0.04 | >100 >100 10 ---- | 178 178 175 174 | White. Do. Do. Do. |
| 2[3] | 5.0 | 7.3 | Acetic anhydride | 50 | Toluene | 50 | Diethylcyclohexylamine | 30 cc. | 0 | Normal pressure | 120 | ---- | 4.90 | 7.3 | 2.7 | >100 | 178 | Yellowish tinge |
| 3[3] | 5.0 | 7.3 | do | 100 | Toluene | 100 | Sodium acetate | 0.05 g. | 135 | do | 125 | ---- | 4.25 | 7.3 | 0.4 | >100 | 178 | Do. |
| 4 | 5.0 | 7.3 | Acetic anhydride | 25 | Toluene | 25 | BF₃OEt₂ | 100 | -20 -10 0 +10 | Normal pressure do do do | 10 10 10 10 | Stop agent methanol | 5.0 5.0 4.98 4.9 | 4.0 2.8 1.4 0.6 | 0.30 0.25 0.21 0.10 | >100 >100 >100 >100 | 178 178 178 175 | White. Do. Do. Do. |
| 5 | 10.0 | 7.5 | Acetic anhydride | 33 | Toluene | 67 | BF₃OEt₂ | 0.4 0.8 1.2 | 110 | Normal pressure | 10 | Stop agent methanol | 8.8 9.0 9.5 | 3.2 1.8 0.7 | 0.14 0.06 0.04 | >100 >100 >100 | 177 177 177 | White. Do. Do. |

[1] 1 millimole per liter=0.1 cc. per liter.
[2] Stop agent 1 wt. percent of solution.
[3] Control.

It can be seen from the results given in Table I that in the case of Examples 2 and 3 which uses a basic catalyst which is without the scope of the present invention, not only the thermal stability of the resulting polymers is low but also only colored polymers are obtainable. It is also seen that in the case of these control methods the capping reaction does not proceed when the temperature is low (0° C.), and not only the capping reaction is imperfect but also the yield is conspicuously low when the temperature is high.

EXAMPLES 6 – 26

The starting polyoxymethylene indicated in Table II was charged to a 200 cc autoclave in the amount prescribed. A vacuum pump was operated at below 1 mm Hg for 10 minutes to remove the polymer-adsorbed oxygen, and thereafter the autoclave was filled with $N_2$ of high purity. The capping agent indicated in Table II was added to the autoclaves under circulation of $N_2$, after which the autoclave was dipped in an oil bath while vigorously stirring the contents of the autoclave to effect the boiling thereof for 1 minute and thorough permeation of the reaction solution indicated in Table II. This was immediately followed by the prompt addition of the Lewis acid catalyst indicated in Table II, closing of the valve, and holding the reaction temperature at that indicated in Table II for the prescribed period of time. Next, the autoclave was dipped in a coolant of −20° C. to effect the quenching of the reaction temperature followed by the addition of the stop agent in this condition to terminate the reaction. The reaction slurry was withdrawn and introduced into 200 cc of cold acetone and filtered. This was followed by repeated washings with acetone and drying under reduced pressure for about 6 hours at 80° C. The results obtained are shown in Table II.

In the case of Example 7, the autoclave was pressured to 50 kg/cm² with nitrogen before closing and in Example 8 et seq., at 5 kg/cm². In the case of Example 18 et seq. the stop agent was added without quenching the reaction system.

Finally, the mechanical properties of polyoxymethylene (A) prepared in accordance with the conditions presented in Example 6 are shown in Table III. As is apparent from the values given in the table, the polyoxymethylene obtained according to the process of the present invention demonstrates outstanding mechanical properties as engineering plastics. These values are far superior to those of polyoxymethylene (B) prepared by the method of the invention disclosed in British Pat. No. 1,103,730, which comprises that in which dioxolan has been inserted in intermediate points of the main chain.

TABLE II

| Ex. | Starting polymer | | Capping agent | | Reaction solution | | Catalyst (Lewis acid) | | | Reaction condition | | | | Resulting polymer | | | | | |
|---|---|---|---|---|---|---|---|---|---|---|---|---|---|---|---|---|---|---|---|
| | Amount charged (g.) | (η) | Name of substance | Amount charged (cc.) | Name of substance | Amount charged (cc.) | Name of substance | Amount charged (cc.) | Concentration¹ | Temp. (°C.) | Pressure (kg/cm²) | Hour (min.) | Stop method² | Yield (g.) | (η) | $k_{222}$ (percent/min.) | Toughness | M.P. (°C.) | Coloration |
| 6 | 10.0 | 7.5 | Acetic anhydride | 33 | Xylene | 67 | $BF_3OEt_2$ | | 0.2 | 160 | 4 | 10 | Quenching | 9.0 | 1.4 | 0.05 | >100 | 176 | White |
| 7 | 10.0 | 7.5 | do | 33 | Cyclohexane | 67 | $BF_3OEt_2$ | | 0.6 | 150 | 57(50) | 10 | Triethylamine | 9.2 | 1.5 | 0.06 | >100 | 176 | Do |
| 8 | 10.0 | 7.5 | Acetic anhydride | 1 | Toluene | 99 | $BF_3OEt_2$ | | 0.8 | 110 | 5 | 10 | Quenching | 9.0 | 1.8 | 0.10 | >100 | 178 | White |
| | 10.0 | 7.5 | do | 10 | do | 90 | $BF_3OEt_2$ | | 0.8 | 110 | 5 | 10 | do | 8.9 | 1.8 | 0.07 | >100 | 178 | Do |
| | 10.0 | 7.5 | do | 50 | do | 50 | $BF_3OEt_2$ | | 0.8 | 110 | 5 | 10 | do | 9.1 | 1.7 | 0.05 | >100 | 178 | Do |
| 9 | 10.0 | 5.5 | Acetic anhydride | 33 | Toluene | 67 | $BF_3OAC_2$ | | 0.8 | 110 | 5 | 10 | Quenching | 9.1 | 1.45 | 0.05 | >100 | 178 | White |
| 10 | 10.0 | 5.5 | do | 33 | do | 67 | 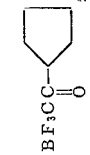 | | 0.8 | 111 | 5 | 10 | do | 9.1 | 1.80 | 0.07 | >100 | 178 | Do |
| 11 | 10.0 | 5.5 | do | 33 | do | 67 | 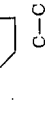 | | 0.8 | 111 | 5 | 10 | do | 9.0 | 1.77 | 0.06 | >100 | 177 | Do |
| 12 | 10.0 | 5.5 | Propionic anhydride | 33 | do | 67 | 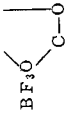 | | 0.8 | 110 | 5 | 10 | Urea, 1 g. | 9.0 | 1.75 | 0.07 | >100 | 177 | Do |

TABLE II – Continued

| Ex. | Starting polymer | | Capping agent | | Reaction solution | | Catalyst (Lewis acid) | | Reaction condition | | | | Resulting polymer | | | | |
|---|---|---|---|---|---|---|---|---|---|---|---|---|---|---|---|---|---|
| | Amount charged (g.) | (η) | Name of substance | Amount charged (cc.) | Name of substance | Amount charged (cc.) | Name of substance | Concentration [1] | (°C.) | Pressure (kg./cm.²) | Hour (min.) | Stop method [2] | Yield (g.) | (η) | k₂₂₂ (percent/min.) | Toughness | M.P. (°C.) | Coloration |
| 13 | 10.0 | 5.5 | Caproic anhydride. | 33 | ---do--- | 67 | BF₃OF  | 0.8 | 110 | 5 | 10 | Diethyl urea, 1 g. | 9.0 | 1.65 | 0.08 | >100 | 177 | Do. |
| 14 | 10.0 | 5.5 | Benzoic anhydride. | 33 | ---do--- | 67 | BF₃ | 0.8 | 110 | 5 | 10 | Methyl urea, 1 g. | 9.1 | 1.77 | 0.05 | >100 | 177 | Do. |
| 15 | 10.0 | 5.5 | Toluic anhydride. | 33 | ---do--- | 67 | SnCl₄ | 0.2 | 110 | 5 | 10 | Ethyl carbamate, 1 g. | 8.5 | 1.60 | 0.10 | >10 | 17 | Do. |
| 16 | 10.0 | 5.5 | Succinic anhydride. | 33 | ---do--- | 67 | AlCl₃ | 0.4 | 110 | 5 | 10 | N-phenyl ethyl carbamate, 1 g. | 8.8 | 1.70 | 0.15 | >100 | 177 | Do. |
| 17 | 10.0 | 5.5 | Methylene diacetate. | 33 | ---do--- | 67 | SbCl₅ | 0.4 | 110 | 5 | 10 | Methyl allophanate, 1 g. | 9.0 | 1.72 | 0.08 | >100 | 177 | Do. |
| 18 | 10.0 | 7.5 | Trioxymethylene diacetate. | 33 | ---do--- | 67 | BF₃OEt₂ | 0.8 | 110 | 5 | 10 | Triethylamine, 1 cc. | 9.0 | 1.70 | 0.05 | >100 | 176 | Do. |
| 19 | 10.0 | 7.5 | Tetraoxymethylene dimethylether. | 33 | ---do--- | 67 | BF₃OEt₂ | 0.8 | 110 | 5 | 10 | ---do--- | 9.2 | 1.68 | 0.04 | >100 | 176 | Do. |
| 20 | 10.0 | 7.5 | Dimethylether of low copolymer of trioxane and  | 33 | ---do--- | 67 | BF₃OEt₂ | 0.8 | 110 | 5 | 10 | ---do--- | 9.0 | 1.70 | 0.05 | >100 | 176 | Do. |
| 21 | 10.0 | 7.5 | Trioxymethylene diphenylether. | 33 | ---do--- | 67 | BF₃OEt₂ | 0.8 | 110 | 5 | 10 | ---do--- | 9.1 | 1.71 | 0.06 | >100 | 177 | Do. |
| 22 | 10.0 | 7.5 | Acetic anhydride. | 100 | | | BF₃OEt₂ | 0.8 | 110 | 5 | 10 | ---do--- | 9.0 | 1.69 | 0.08 | >100 | 178 | Do. |
| 23 | 10.0 | Trioxane-ethylene oxide copolymer, 3.0. | | Tetraoxymethylene diacetate. | 33 | Trichloroethylene. | 67 | BF₃OAc₂ | 0.8 | 110 | N₂-20 | 10 | ϵCaprolactam, 1 g. | 7.2 | 1.5 | 0.07 | >100 | 178 | Do. |
| 24 | 10.0 | Tetraoxan-1,3-dioxolan copolymer, 2.8. | | Acetic anhydride. | 33 | Butyl acetate. | 67 | BF₃OAc₂ | 0.8 | 110 | N₂-20 | 10 | Triethylamine oxide, 1 g. | 6.8 | 1.6 | 0.06 | >100 | 178 | Do. |
| 25 | 10.0 | CH₂O/ketone copolymer, 3.2. | | Succinic anhydride. | 33 | Toluene. | 67 | BF₃OAc₂ | 0.8 | 110 | N₂-20 | 10 | Piperidyl urea, 1 g. | 7.5 | 1.4 | 0.06 | >100 | 178 | Do. |
| 26 | 20.0 | Trioxane homopolymer, 2.5. | | Acetic anhydride. | 10 | ---do--- | 10 | BF₃OAc₂ | 0.8 | 110 | N₂-20 | 10 | Cyclohexanone, 5 cc. | 12.0 | 1.4 | 0.06 | >100 | 176 | Do. |

[1] 1 millimole per liter = 0.1 cc. per liter.
[2] Stop agent 1 wt. percent of solution.
[3] N₂ initial pressure.

TABLE III
Mechanical Properties of Stabilized Polyoxymethylene

| Property | Unit | Invention Polyoxymethylene (A) | Dioxolan-inserted-Polyoxymethylene*(B) |
|---|---|---|---|
| Melting point | °C. | 178 | 165 |
| Melt index | g/10 min | 15 | 13 |
| Impact strength | kg cm/25 mm | 32.7 | 19.8 |
| Tensile strength | kg/cm² | 690 | 580 |
| Elongation | % | 35 | 18 |
| Modulus in tension | kg/cm² | 22,700 | 18,800 |
| Flexural modulus | kg/cm² | 27,400 | 22,000 |
| Hardness, Rockwell | R-scale | 127 | 105 |

*Dioxolan-inserted polyoxymethylene prepared in accordance with the method of British Pat. No. 1,103,730 (Example 3) using as the starting polyoxymethylene the same polyoxymethylene used in Example 6.

We claim:

1. A process for producing a film-forming heat-resistant polymer, which comprises contacting a starting polyoxymethylene homopolymer of formaldehyde, trioxane or tetraoxane concurrently with
   a. a capping agent in an amount of at least 1 percent by weight based on the weight of the starting polymer, and selected from the group consisting of
      i. an anhydride of an aliphatic mono-carboxylic acid of two to 18 carbon atoms, and
      ii. an oxyalkylene diester of the formula

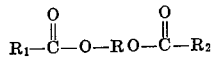

wherein R is a methylene group, $R_1$ and $R_2$ each being selected from the group consisting of alkyl and aryl groups of up to 18 carbon atoms; and (b) a Lewis acid, in a concentration of from 1/100 m mol to 100 m mol per liter of reaction medium, and selected from the group consisting of
   i. a halide selected from the group consisting of $BF_3$, $BCl_3$, $BBr_3$, $BI_3$, $AlCl_3$, $TiCl_4$, $SnCl_4$, $SnBr_4$, $FeCl_3$, $AnCl_2$ and $SbCl_5$, and
   ii. a complex of said halide with ethers, esters, cyclic ethers, acid anhydrides, alcohols, ketones and water, at a temperature ranging from −50° to 180° C. for a period of from 1 to 200 minutes in the liquid phase.

2. The process of claim 1 wherein said Lewis acid is selected from the group consisting of boron trifluoride and complexes of boron trifluoride.

3. The process of claim 1 which comprises adding to the reaction system, after submitting said polyoxymethylene polymer to the action of the capping agent and said Lewis acid, a stop agent selected from the group consisting of (a) alcohol or water, (b) amines, (c) amine oxides, (d) phosphines, (e) urea, thiourea, mono- or dialkyl or aryl-substituted ureas, (f) lactams (g) lactones and (h) ketones to stop the reaction.

* * * * *